United States Patent
de Lavarene et al.

(10) Patent No.: US 11,120,036 B2
(45) Date of Patent: Sep. 14, 2021

(54) SYSTEM AND METHOD FOR EFFICIENT REPURPOSING OF CONNECTIONS IN A MULTI-TENANT DATABASE ENVIRONMENT

(71) Applicant: ORACLE INTERNATIONAL CORPORATION, Redwood Shores, CA (US)

(72) Inventors: Jean de Lavarene, Versailles (FR); Yuri Dolgov, San Jose, CA (US); Vidya Hegde, Bangalore (IN); Saurabh Verma, Bangalore (IN); Krishna Chandra, Bangalore (IN); Aramvalarthanathan Namachivayam, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 20 days.

(21) Appl. No.: 15/227,899

(22) Filed: Aug. 3, 2016

(65) Prior Publication Data
US 2018/0039678 A1 Feb. 8, 2018

(51) Int. Cl.
*G06F 16/25* (2019.01)
*G06F 16/2455* (2019.01)
(Continued)

(52) U.S. Cl.
CPC ............ *G06F 16/25* (2019.01); *G06F 9/5061* (2013.01); *G06F 16/24552* (2019.01); *H04L 67/42* (2013.01)

(58) Field of Classification Search
CPC .......... G06F 17/30557; G06F 17/3048; G06F 16/25; G06F 16/24552; G06F 9/5061; H05L 67/42; H04L 67/42
(Continued)

(56) References Cited

U.S. PATENT DOCUMENTS 8,145,759 B2  3/2012  Bhogi et al.
8,533,503 B2  9/2013  Lippett
(Continued)

FOREIGN PATENT DOCUMENTS

JP   2013239199   11/2013

OTHER PUBLICATIONS

Oracle, "Fusion Middleware Configuring . . . 10 Tuning data source connection pools", 2011. 18 pages.*
(Continued)

*Primary Examiner* — Tony Mahmoudi
*Assistant Examiner* — Michael Le
(74) *Attorney, Agent, or Firm* — Tucker Ellis LLP

(57) ABSTRACT

Described herein are systems and methods for providing access to a database in a multi-tenant environment, including the use of a connection pool, with support for efficient repurposing of connections. In accordance with an embodiment, a software application can request that a connection be provided, to enable access to the database. In response to receiving the request, the connection pool can first determine if a particular connection with the exact desired attributes already exists within the pool, but is borrowed at the time of the request. If such a connection exists, then the connection pool can wait a period of time for that particular connection to become available, referred to herein as a double-wait. Subsequently, if the particular connection is not made available within the double-wait time period, the connection pool resumes its usual operation, for example by repurposing other connections.

12 Claims, 10 Drawing Sheets

(51) Int. Cl.
*G06F 9/50* (2006.01)
*H04L 29/06* (2006.01)

(58) Field of Classification Search
USPC .......................................................... 707/781
See application file for complete search history.

(56) References Cited

U.S. PATENT DOCUMENTS

| | | | |
|---|---|---|---|
| 8,732,439 B2 | 5/2014 | Lippett | |
| 8,751,773 B2 | 6/2014 | Lippett | |
| 9,164,953 B2 | 10/2015 | Lippett | |
| 9,286,262 B2 | 3/2016 | Lippett | |
| 9,442,886 B2 | 9/2016 | Lippett | |
| 9,501,517 B2* | 11/2016 | Konersmann | G06F 16/2379 |
| 2005/0038801 A1* | 2/2005 | Colrain | G06F 16/21 |
| 2005/0262507 A1* | 11/2005 | Langen | G06F 9/4881 |
| | | | 718/100 |
| 2007/0136311 A1* | 6/2007 | Kasten | H04L 67/28 |
| 2008/0250419 A1* | 10/2008 | Kasten | H04L 67/14 |
| | | | 718/104 |
| 2014/0324911 A1* | 10/2014 | de Lavarene | G06F 17/30289 |
| | | | 707/781 |
| 2015/0207758 A1* | 7/2015 | Mordani | H04L 47/78 |
| | | | 709/226 |
| 2018/0019922 A1* | 1/2018 | Robison | H04L 43/0894 |

OTHER PUBLICATIONS

"Oracle Fusion Middleware—Configuring and Managing JDBC Data Sources for Oracle WebLogic Server, 11g Release 1 (10.3.5)", Apr. 2011, pp. 1-148.

"Oracle Universal Connection Pool for JDBC—Developer's Guide, 11g Release 2 (11.2)", Sep. 2009, pp. 1-74.

Nicolas Michael, et al., "Downtime-Free Live Migration in a Multitenant Database" In: "Network and Parallel Computing", Jan. 1, 2015, Springer International Publishing, vol. 8904, pp. 130-155, 26 pages.

Notification of Transmittal of the International Search Report and the Written Opinion of the International Searching Authority for Application No. PCT/US2017/045288, dated Nov. 10, 2017, 13 pages.

Oracle, "Oracle Database Concepts, 11g Release 2 (11.2)", May 2014, 472 pages.

European Patent Office, Communication pursuant to Article 94(3) EPC dated Apr. 8, 2021 for EP Application No. 17752237.2, 7 pages.

* cited by examiner

SYSTEM AND METHOD FOR EFFICIENT REPURPOSING OF CONNECTIONS IN A MULTI-TENANT DATABASE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software application servers and databases, and are particularly related to systems and methods for providing access to a database in a multi-tenant environment, including the use of a connection pool, with support for efficient repurposing of connections.

BACKGROUND

Generally described, in a database environment, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

SUMMARY

Described herein are systems and methods for providing access to a database in a multi-tenant environment, including the use of a connection pool, with support for efficient repurposing of connections. In accordance with an embodiment, a software application can request that a connection be provided, to enable access to the database. In response to receiving the request, the connection pool can first determine if a particular connection with the exact desired attributes already exists within the pool, but is borrowed at the time of the request. If such a connection exists, then the connection pool can wait a period of time for that particular connection to become available, referred to herein as a double-wait. Subsequently, if the particular connection is not made available within the double-wait time period, the connection pool resumes its usual operation, for example by repurposing other connections.

DETAILED DESCRIPTION

As described above, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

Creating connection objects can be costly in terms of time and resources. For example, tasks such as network communication, authentication, transaction enlistment, and memory allocation, all contribute to the amount of time and resources it takes to create a particular connection object. Since connection pools allow the reuse of such connection objects, they help reduce the number of times that the various objects must be created.

One example of a connection pool is Oracle Universal Connection Pool (UCP), which provides a connection pool for caching Java Database Connectivity (JDBC) connections. For example, the connection pool can operate with a JDBC driver to create connections to a database, which are then maintained by the pool; and can be configured with properties that are used to further optimize pool behavior, based on the performance and availability requirements of a requesting software application.

Connection Labeling

Figure 1:
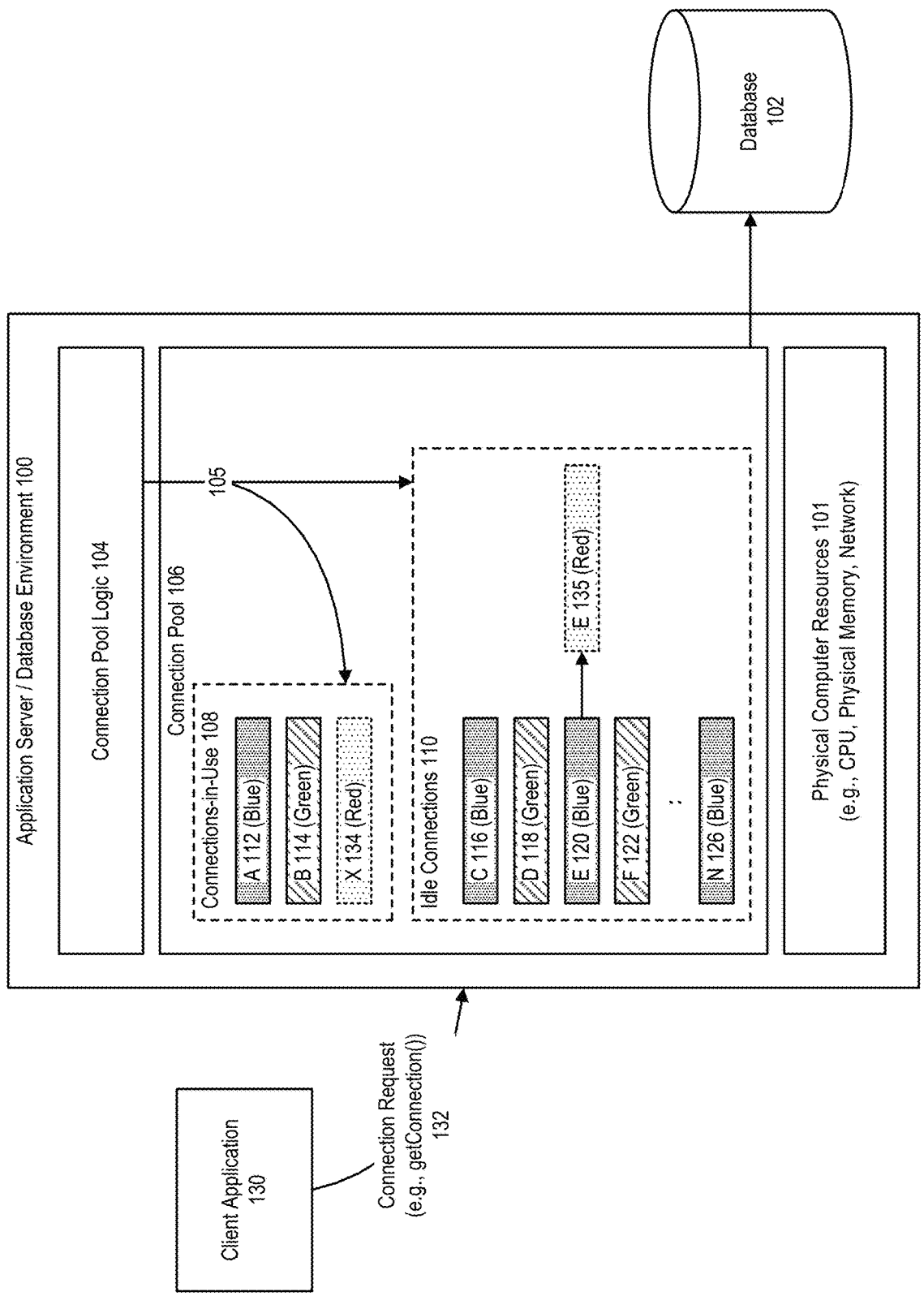
FIG. 1 illustrates a system that includes a connection pool, in accordance with an embodiment.

FIG. 1 illustrates a system that includes a connection pool, in accordance with an embodiment.

As illustrated in FIG. 1, in accordance with an embodiment, an application server or database environment 100, which includes physical computer resources 101 (e.g., a processor/CPU, memory, and network components), for example an Oracle WebLogic Server, Oracle Fusion Middleware, or other application server or database environment, can include or provide access to a database 102, for example an Oracle database, or other type of database.

As further illustrated in FIG. 1, in accordance with an embodiment, the system also includes a connection pool logic 104 or program code, which when executed by a computer controls 105 the creation and use of connection objects in a connection pool 106, including, for example, connections that are currently in use 108 by a software application, and connections that are idle 110, or are not currently being used.

Software applications can initialize connections retrieved from a connection pool, before using the connection to access, or perform work at the database. Examples of initialization can include simple state re-initializations that require method calls within the application code, or more complex initializations including database operations that require round trips over a network. The computational cost of these latter types of initialization may be significant.

Some connection pools (for example, UCP) allow their connection pools to be configured using connection pool properties, that have get and set methods, and that are available through a pool-enabled data source instance. These get and set methods provide a convenient way to programmatically configure a pool. If no pool properties are set, then a connection pool uses default property values.

In accordance with an embodiment, labeling connections allows a client software application to attach arbitrary name/value pairs to a connection. The application can then request a connection with a desired label from the connection pool. By associating particular labels with particular connection states, an application can potentially retrieve an already-initialized connection from the pool, and avoid the time and cost of re-initialization. Connection labeling does not impose any meaning on user-defined keys or values; the meaning of any user-defined keys and values is defined solely by the application.

For example, as illustrated in FIG. 1, in accordance with an embodiment, the connection pool can include a plurality of connections that are currently in use by software applications, here indicated as connections A 112 and B 114. Each of the connections can be labeled, for example connection A is labeled (Blue) and connection B is labeled (Green). These labels/colors are provided for purposes of illustration, and as described above can be arbitrary name/value pairs attached to a connection by a client application. In accordance with various embodiments, different types of labels can be used, to distinguish between different connection types; and different applications can attach different labels/colors to a particular connection type.

As further illustrated in FIG. 1, in accordance with an embodiment, the connection pool can also include a plurality of connections that are idle, or are not currently being used by software applications, here indicated as connections C 116, D 118, E 120, F 122, G 124 and N 126. Each of the idle connections can be similarly labeled, in this illustration as (Blue) or (Green), and again these labels/colors are provided for purposes of illustration.

As further illustrated in FIG. 1, in accordance with an embodiment, if a software application 130 wishes to make a request on the database, using a particular type of connection, for example a (Red) connection, then the application can make a "getConnection(Red)" request 132. In response, the connection pool logic will either create a new (Red) connection, here indicated as X 134 (Red); or repurpose an existing idle connection from (Blue or Green) to (Red), here indicated as E 135 (Red).

Sharded Databases

In accordance with an embodiment, sharding is a database-scaling technique which uses a horizontal partitioning of data across multiple independent physical databases. The part of the data which is stored in each physical database is referred to as a shard. From the perspective of a software client application, the collection of all of the physical databases appears as a single logical database.

In accordance with an embodiment, the system can include support for use of a connection pool with sharded databases. A shard director or listener provides access by software client applications to database shards. A connection pool (e.g., UCP) and database driver (e.g., a JDBC driver) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

Figure 2:
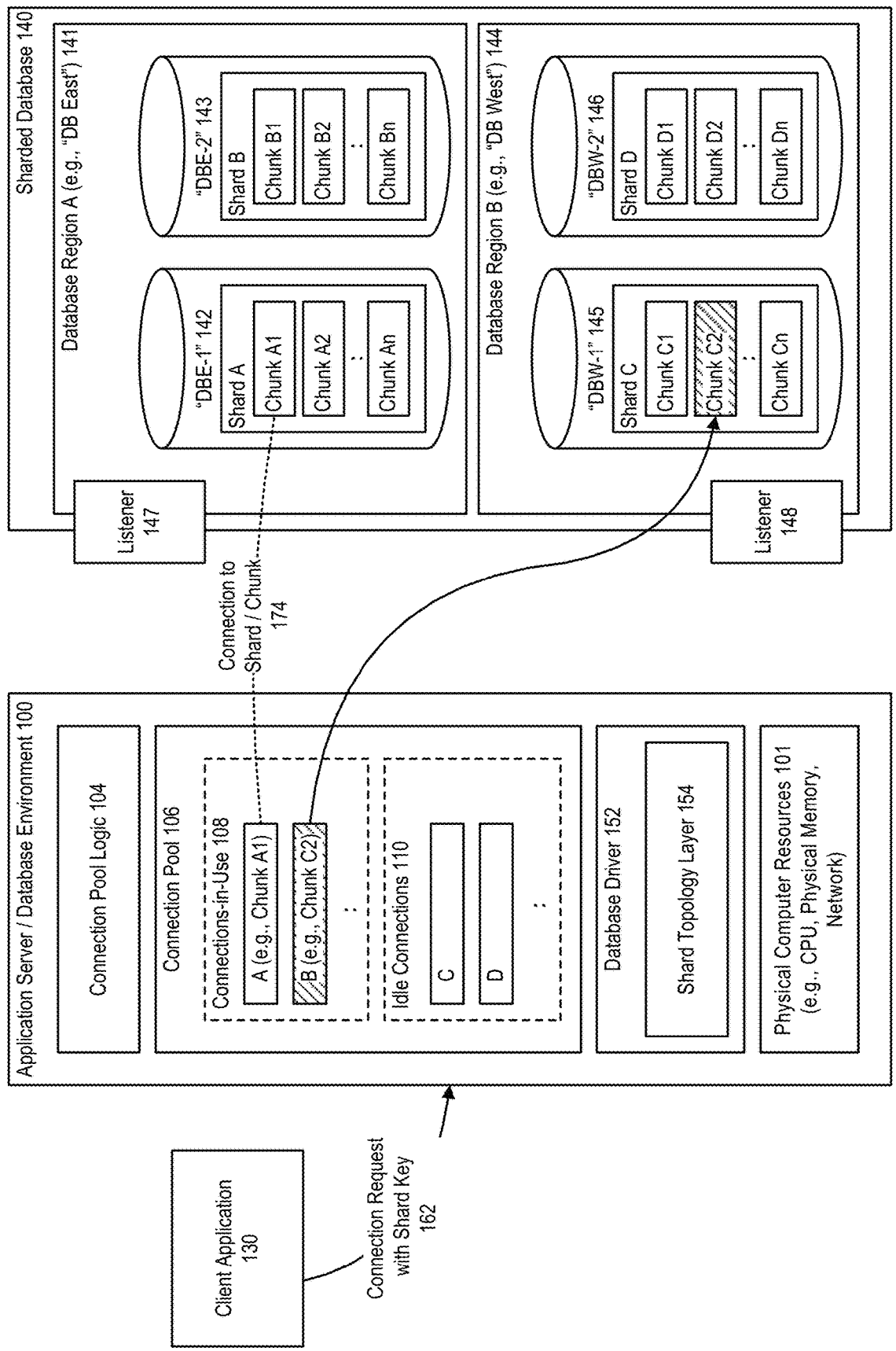
FIG. 2 further illustrates a system that includes a connection pool, including support for use of a sharded database, in accordance with an embodiment.

FIG. 2 further illustrates a system that includes a connection pool, including support for use of a sharded database, in accordance with an embodiment.

In accordance with an embodiment, a database table can be partitioned using a shard key (SHARD_KEY), for example as one or more columns that determine, within a particular shard, where each row is stored. A shard key can be provided in a connect string or description as an attribute of connect data (CONNECT_DATA). Examples of shard keys can include a VARCHAR2, CHAR, DATE, NUMBER, or TIMESTAMP in the database. In accordance with an embodiment, a sharded database can also accept connections without a shard key or shard group key.

In accordance with an embodiment, to reduce the impact of resharding on system performance and data availability, each shard can be subdivided into smaller pieces or chunks. Each chunk acts as a unit of resharding that can be moved from one shard to another. Chunks also simplify routing, by adding a level of indirection to the shard key mapping.

For example, each chunk can be automatically associated with a range of shard key values. A user-provided shard key can be mapped to a particular chunk, and that chunk mapped to a particular shard. If a database operation attempts to operate on a chunk that is not existent on a particular shard, then an error will be raised. When shard groups are used, each shard group is a collection of those chunks that have a specific value of shard group identifier.

A shard-aware client application can work with sharded database configurations, including the ability to connect to one or multiple database shards in which the data is partitioned based on one or more sharding methods. Each time a database operation is required, the client application can determine the shard to which it needs to connect.

In accordance with an embodiment, a sharding method can be used to map shard key values to individual shards. Different sharding methods can be supported, for example: hash-based sharding, in which a range of hash values is assigned to each chunk, so that upon establishing a database connection the system applies a hash function to a given value of the sharding key, and calculates a corresponding hash value which is then mapped to a chunk based on the range to which that value belongs; range-based sharding, in which a range of shard key values is assigned directly to individual shards; and list-based sharding, in which each shard is associated with a list of shard key values.

As illustrated in FIG. 2, in accordance with an embodiment a sharded database 140 can comprise a first database region A (here indicated as "DB East", DBE) 141, including sharded database instances "DBE-1" 142, with a shard A stored as chunks A1, A2, . . . An; and "DBE-2" 143, with a shard B stored as chunks B1, B2, Bn.

As further illustrated in FIG. 2, in accordance with an embodiment, a second database region B (here indicated as "DB West", DBW) 144, includes sharded database instances "DBW-1" 145, with a shard C stored as chunks C1, C2, Cn; and "DBW-2" 146, with a shard D stored as chunks D1, D2, . . . Dn.

In accordance with an embodiment, each database region or group of sharded database instances can be associated with a shard director or listener (e.g., an Oracle Global Service Managers (GSM) listener, or another type of listener). For example, as illustrated in FIG. 2, a shard director or listener 147 can be associated with the first database region A; and another shard director or listener 148 can be associated with the second database region B. The system can include a database driver (e.g., a JDBC driver) 152 that maintains a shard topology layer 154, which over a period of time learns and caches shard key ranges to the location of each shard in a sharded database.

In accordance with an embodiment, a client application can provide one or more shard keys to the connection pool during a connection request 162; and, based on the one or more shard keys, and information provided by the shard topology layer, the connection pool can route the connection request to a correct or appropriate shard.

In accordance with an embodiment, the connection pool can also identify a connection to a particular shard or chunk by its shard keys, and allow re-use of a connection when a request for a same shard key is received from a particular client application.

For example, as illustrated in FIG. 2, in accordance with an embodiment, a connection to a particular chunk (e.g., chunk A1) can be used to connect 174, to that chunk. If there are no available connections in the pool to the particular shard or chunk, the system can attempt to repurpose an existing available connection to another shard or chunk, and re-use that connection. The data distribution across the shards and chunks in the database can be made transparent to the client application, which also minimizes the impact of re-sharding of chunks on the client.

When a shard-aware client application provides one or more shard keys to the connection pool, in association with a connection request; then, if the connection pool or database driver already has a mapping for the shard keys, the connection request can be directly forwarded to the appropriate shard and chunk, in this example, to chunk C2.

When a shard-aware client application does not provide a shard key in association with the connection request; or if the connection pool or database driver does not have a mapping for a provided shard key; then the connection request can be forwarded to an appropriate shard director or listener.

Multi-Tenant Environments

In accordance with an embodiment, the system can include support for cloud-based or multi-tenant environments using connection labeling. For example, a multi-tenant cloud environment can include an application server or database environment that includes or provides access to a database for use by multiple tenants or tenant applications, in a cloud-based environment.

Figure 3:
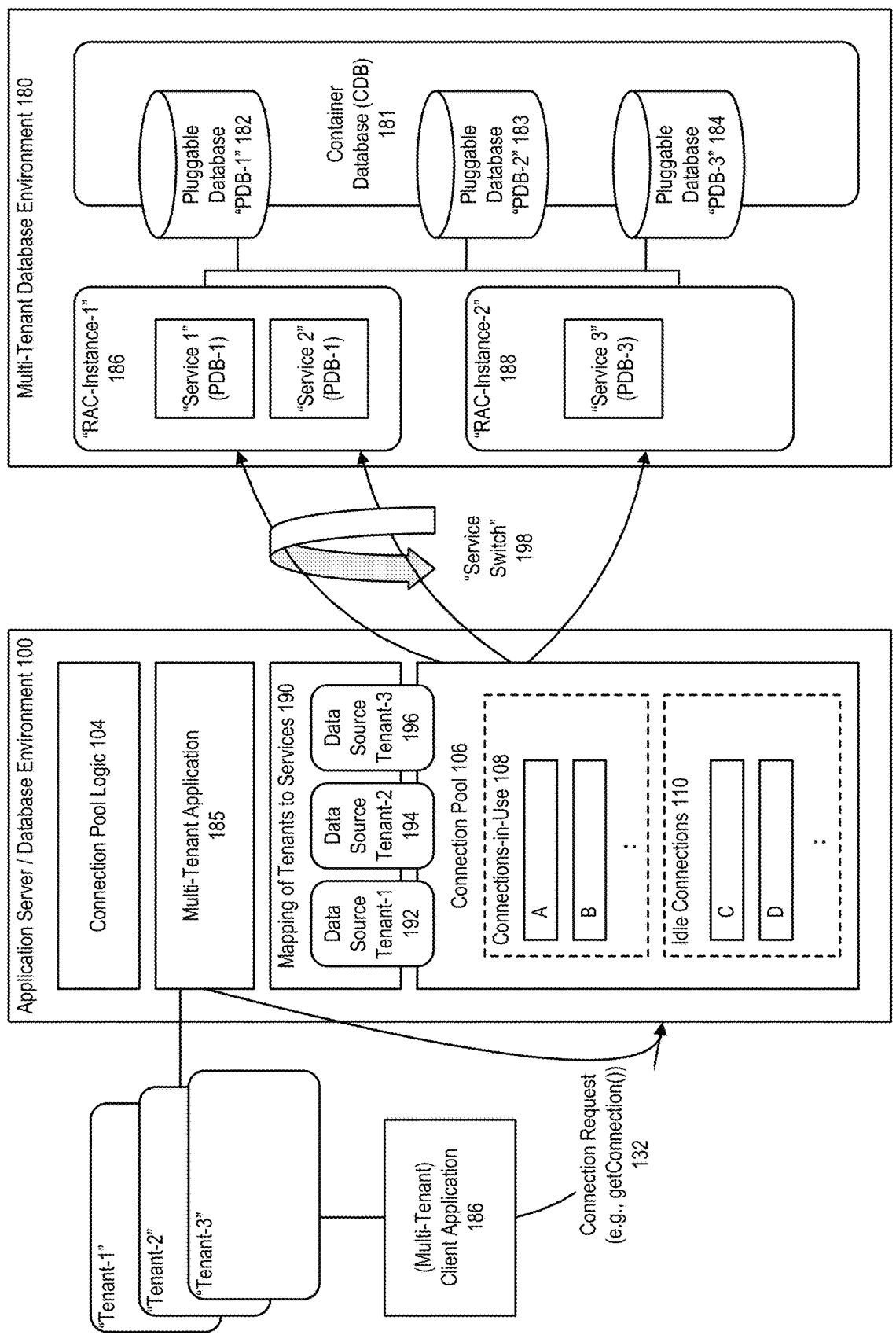
FIG. 3 further illustrates a system that includes a connection pool, including support for use in a multi-tenant environment, in accordance with an embodiment.

FIG. 3 further illustrates a system that includes a connection pool, including support for use in a multi-tenant environment, in accordance with an embodiment.

Software applications, which can be accessed by tenants via a cloud or other network, may, similarly to the environments described above, initialize connections retrieved from a connection pool before using the connection.

As described above, examples of initialization can include simple state re-initializations that require method calls within the application code, or more complex initializations including database operations that require round trips over a network.

As also described above, labeling connections allows an application to attach arbitrary name/value pairs to a connection, so that the application can then request a connection with a desired label from the connection pool, including the ability to retrieve an already-initialized connection from the pool and avoid the time and cost of re-initialization.

As illustrated in FIG. 3, in accordance with an embodiment, a multi-tenant database environment 180 can include, for example, a container database (CDB) 181, and one or more pluggable database (PDB), here illustrated as "PDB-1" 182, "PDB-2" 183, and "PDB-3" 184.

In accordance with an embodiment, each PDB can be associated with a tenant, here illustrated as "Tenant-1", "Tenant-2", and "Tenant-3", of a multi-tenant application that is either hosted by the application server or database environment 185, or provided as an external client application 186, and which provides access to the database environment through the use of one or more Oracle Real Application Cluster (RAC) instances 186, 188, including in this example "RAC-Instance-1", and "RAC-Instance-2"; one or more services, including in this example Service-1", "Service-2", and "Service-3", and a mapping of tenants to services 190.

In the example illustrated in FIG. 3, an application being used by a tenant to access the database environment, can make connection requests associated with that tenant's data source 192, 194, 196, and the system can switch services 198 if necessary, to utilize connections to existing RAC instances or PDBs.

Server-Side Connection Pools

In accordance with an embodiment, the system can utilize a server-side connection pool tagging feature, such as that provided, for example, by Oracle Database Resident Connection Pool (DRCP). A server-side connection pool tagging feature allows user applications or clients to selectively obtain a connection to a database environment, based on use of a single tag that is understood by that database environment.

In accordance with an embodiment, only one tag is associated per connection. The database server does not communicate the tag value to the user applications or clients, but rather communicates a tag-match (for example, as a Boolean value).

Efficient Repurposing of Connections in the Pool

In accordance with an embodiment, the system can include support for efficient repurposing of connections. A software application can request that a connection be provided, to enable access to the database. In response to receiving the request, the connection pool can first determine if a particular connection with the exact desired attributes already exists within the pool, but is borrowed at the time of the request. If such a connection exists, then the connection pool can wait a period of time for that particular connection to become available, referred to herein as a double-wait. Subsequently, if the particular connection is not made available within the double-wait time period, the connection pool resumes its usual operation, for example by repurposing other connections.

With a traditional connection pool, whenever a request is made by a software application for a connection with specific desired attributes (e.g., having a particular connection label or a particular session state), the usual procedure is for the connection pool to: (1) determine if there is an available connection which has the desired attributes; or if not, then (2) determine if there is an available connection having different attributes, but which can be repurposed to satisfy the request, by modifying its attributes; or (3) attempt to create an entirely new connection with the desired attributes.

If the maximum number of allowed connections has been reached, then the connection pool will generally wait for an existing, albeit busy, connection to be released, and then repurpose the released connection.

In such an environment, the connection pool supports a single-wait functionality, i.e., to wait for a suitable connection to become available, and then to act accordingly.

However, in accordance with an embodiment, the system can include a double-wait functionality, which enables the connection pool, instead of or in addition to its single-wait functionality described above, to first determine if a particular connection with the exact desired attributes already exists, but is borrowed at the time of the request; and if so, to wait for a period of time for that connection to become available (referred to herein as a connection double-wait timeout ($\Delta t_{cdw}$)), before resuming its usual procedure as described above.

With double-wait functionality, the possibility of reusing connections, without repurposing or otherwise having to modify the attributes of those connections, is increased. Since change-connection attributes are computationally-expensive operations, in terms of roundtrip/latency and server-side CPU usage, the use of a double-wait provides an efficient means of providing and/or repurposing connections in response to requests.

For example, in accordance with an embodiment, the system can include support for cloud-based or multi-tenant environments, including an application server or database that includes or provides access to a database, for use by multiple tenants or tenant applications.

In such an environment, when there is no connection available in the pool for a given tenant, then instead of repurposing an available connection that is associated with another tenant (which would be a computationally-expensive operation), the connection pool can double-wait, including first determining if the pool already includes a connection for the given tenant, even though that particular connection is currently borrowed (i.e., a particular connection with the exact desired attributes). If so, then the connection pool can wait for a period of time for that particular (i.e., that given tenant's) connection to become available, so that it can be provided without requiring a change in attributes. The connection pool will only repurpose another tenant's connection if no connection with the exact desired attributes is made available.

FIGS. 4-8 illustrate support for efficient repurposing of connections, in a connection pool environment, in accordance with an embodiment.

As described above, labeling connections allows a client software application to attach arbitrary name/value pairs to a connection. The application can then request a connection with a desired label, to be provided by the connection pool. By associating particular labels with particular connection states, an application can potentially retrieve an already-initialized connection from the pool, and avoid the time and cost of re-initialization. For example, if a software application wishes to make a request on the database, using a particular type of connection, e.g., a (Red) connection, then the connection pool logic can either create a new (Red) connection; or repurpose an existing idle connection from e.g., (Blue or Green) to (Red).

However, a connection pool's borrow operation is typically complex, comprising several orchestrated connection selection mechanisms—for example, RAC load balancing, high availability, affinity, connection validation, labels processing, harvesting, or processing of various timeouts. While the above example uses different colors to illustrate that a repurposing could include a transformation of, for example, a (Blue) connection to a (Red) connection; in actual practice this transformation might require closing a connection on one RAC instance, and creating a replacement on another RAC instance, together with the various procedures required to implement such an operation.

For attributes that are computationally-inexpensive, this may be a relatively straightforward process. However, computationally-expensive attribute changes, for example, changing a pluggable database within a container database, as might be implemented in a multi-tenant environment, require a more considered approach.

Figure 4:
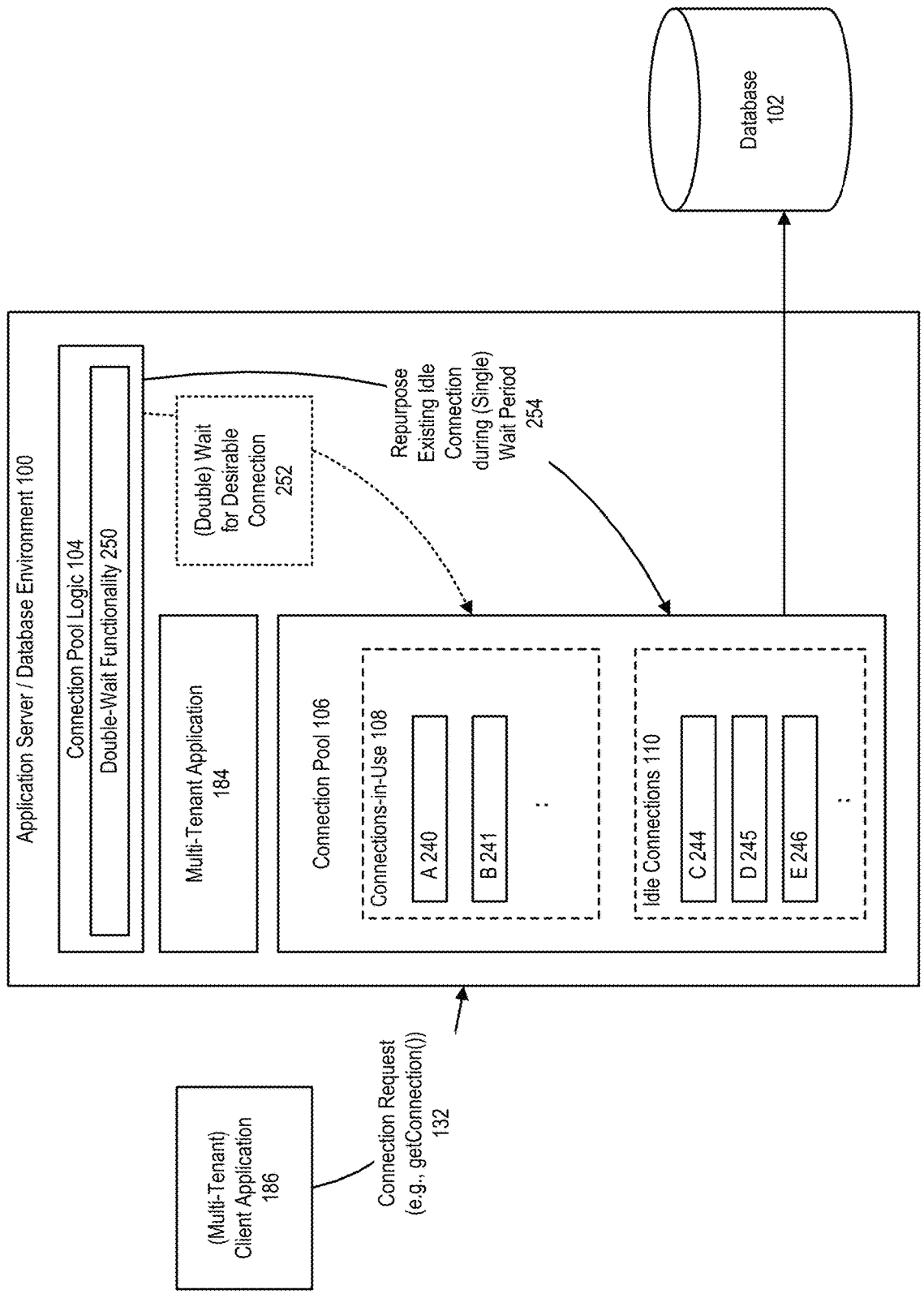
FIG. 4 illustrates support for efficient repurposing of connections, in a connection pool environment, in accordance with an embodiment.

As illustrated in FIG. 4, in accordance with an embodiment, a double-wait functionality 250 can be used by the connection pool, to perform a wait 252, followed, if appropriate, by a repurpose connection after wait 254, the process of which is described in further detail below.

In accordance with an embodiment, the described approach recognizes that, even if there may be a matching connection for a borrow request, and a borrowing thread is double-waiting for this connection, there is no guarantee that the connection is returned within the connection double-wait timeout ($\Delta t_{cdw}$).

To address this, in accordance with an embodiment, the connection double-wait timeout can be set smaller than the connection wait timeout ($\Delta t_{cw}$), so that the system can revert back to its usual procedure, i.e., to a single-wait borrowing mode, if the double-wait was unsuccessful.

For example, in accordance with an embodiment, the connection double-wait timeout ($\Delta t_{cdw}$) can be set as 50 milliseconds, with the (total) connection wait timeout or time period ($\Delta t_{cw}$) set as 500 milliseconds.

Additionally, in accordance with an embodiment, the described approach recognizes that the system generally may not be able to predict when a borrowed connection will be returned to the pool. However, relying on signal events for such information would be expensive performance-wise. For example, if the system were to wait for a signal API, for every returned connection, this would slow down the performance of the connection borrow/return mechanism.

To address this, in accordance with an embodiment, the connection pool supports a borrow operation that combines a small number of waiting-for-a-signal API calls, with busy-waiting polls of a pool, for obtaining a required connection. Generally, the only situation in which the borrow operation waits to be signaled, is when there is nothing to borrow at the moment. An appearance of a valid available connection triggers all of the currently-borrowing threads to start polling.

Generally, threads should poll the pool with small (e.g., nanoseconds, or zero-time) intervals, to attempt to obtain an appropriate connection as soon as possible. However, in practice, zero-time polling intervals can result in extensive CPU usage. To address this, in accordance with an embodiment, the connection pool supports an auto-tuning process, as further described below, to provide a balance between CPU load and endurance of these intervals.

For example, in accordance with an embodiment, an inter-poll sleeping interval can be computed with:

$$\Delta t_{sleep} = \Delta t_0 (|CPU_{expected} - CPU_{current}|)$$

Where $\Delta t_0$ is an empirical constant time interval, $CPU_{expected}$ expected is the percentage CPU utilization expected, and $CPU_{current}$ is the percentage current CPU utilization. In accordance with an embodiment, the value for CPU utilization is an integral value of CPU utilization for all participating threads.

Single-Wait and Double-Wait Modes

In accordance with an embodiment, the system is configured to poll the connection pool using two different modes: generally referred to herein as a connection single-wait mode, and a connection double-wait mode.

In a connection single-wait mode, the connection pool logic assumes that a borrow request expects any connection to show up available to be reserved (for example, any of (Red), (Blue), or (Green) connections, the particular connection type does not matter), repurposed if needed (e.g., a (Red) connection is transformed to (Green)), and then borrowed. This single-wait mode lasts for the duration of the connection wait timeout ($\Delta t_{cw}$), which can be defined as a configurable connection pool property.

In a connection double-wait mode, the connection pool assumes that a borrow request expects only a connection of required quality or type, i.e., having the exact desired attributes (e.g. only (Red) connections), such that a repurpose is not needed. This double-wait mode lasts for the duration of the connection double-wait timeout ($\Delta t_{cdw}$), which can be defined as a configurable connection pool property, or automatically/dynamically calculated by the system.

By definition, the connection wait timeout ($\Delta t_{cw}$) is the longest interval of time for a borrowing thread to poll a pool for a connection.

In accordance with an embodiment, the system can be configured to poll in double-wait mode first, and then poll in single-wait mode. Once the double-wait determination does not guarantee a connection to be released within the $\Delta t_{cdw}$ time period, it=is less useful to set ($\Delta t_{cdw} = \Delta t_{cw}$), since in many situations this would necessitate time spent, with nothing achieved, before an inevitable repurpose. Conversely, setting the value for $\Delta t_{cdw} = 0$ would mean that the double-wait mode is turned off.

The above indicates that, in accordance with an embodiment, the value for double-wait timeout $\Delta t_{cdw}$ should generally float between some bounds, for example:

$$0 \leq \Delta t_{cdw} \leq \Delta t_{cw}$$

Once the value for $\Delta t_{cdw} \leq \Delta t_{cw}$, there is some non-zero time interval to spend for single-waiting for any connection, and repurpose that connection if double-wait was unsuccessful.

In accordance with an embodiment, the value for double-wait timeout $\Delta t_{cdw}$ can be defined as a configurable property. As described above, another approach is to use an auto-tuning process. For example, the double-wait interval can be made proportional to the statistical average borrow ("ab") time interval $\Delta t_{ab}$, which can be computed with:

$$\Delta t_{ab} = \frac{\sum_{i=0}^{i=n} \Delta t_i}{n}$$

Where n is some amount of most recent $\Delta t_i$-individual (i) borrow time intervals (i.e., the time passed between a connection borrow, and a return back to a pool) for all connections of a required type in a pool. The value for $\Delta t_{ab}$ is inversely proportional to the number of borrowed connections fitting a pending borrow request ($N_c$), and is proportional to the number of similar pending borrow requests, i.e., those request looking for connection of the same type ($N_{br}$).

In accordance with an embodiment, the value for double-wait timeout ($\Delta t_{cdw}$) can be automatically/dynamically calculated by the system according to the auto-tuning process as:

$$\Delta t_{cdw} = \min\left(F \Delta t_{cw}, \frac{N_{br} \Delta t_{ab}}{N_c}\right)$$

Where F is maximal allowed value of $\Delta t_{cdw}/\Delta t_{cw}$ within the range of [0 . . . 1].

Although it would be possible to tune the value of $\Delta t_{cdw}$ prior to each single poll, in practice this approach would require some analysis to determine the number of borrowed connections of required type and would require some resources. Instead, the system can compute $\Delta t_{cdw}$ once per each particular borrow operation, and then use it as a constant for that particular borrow operation.

Figure 5:
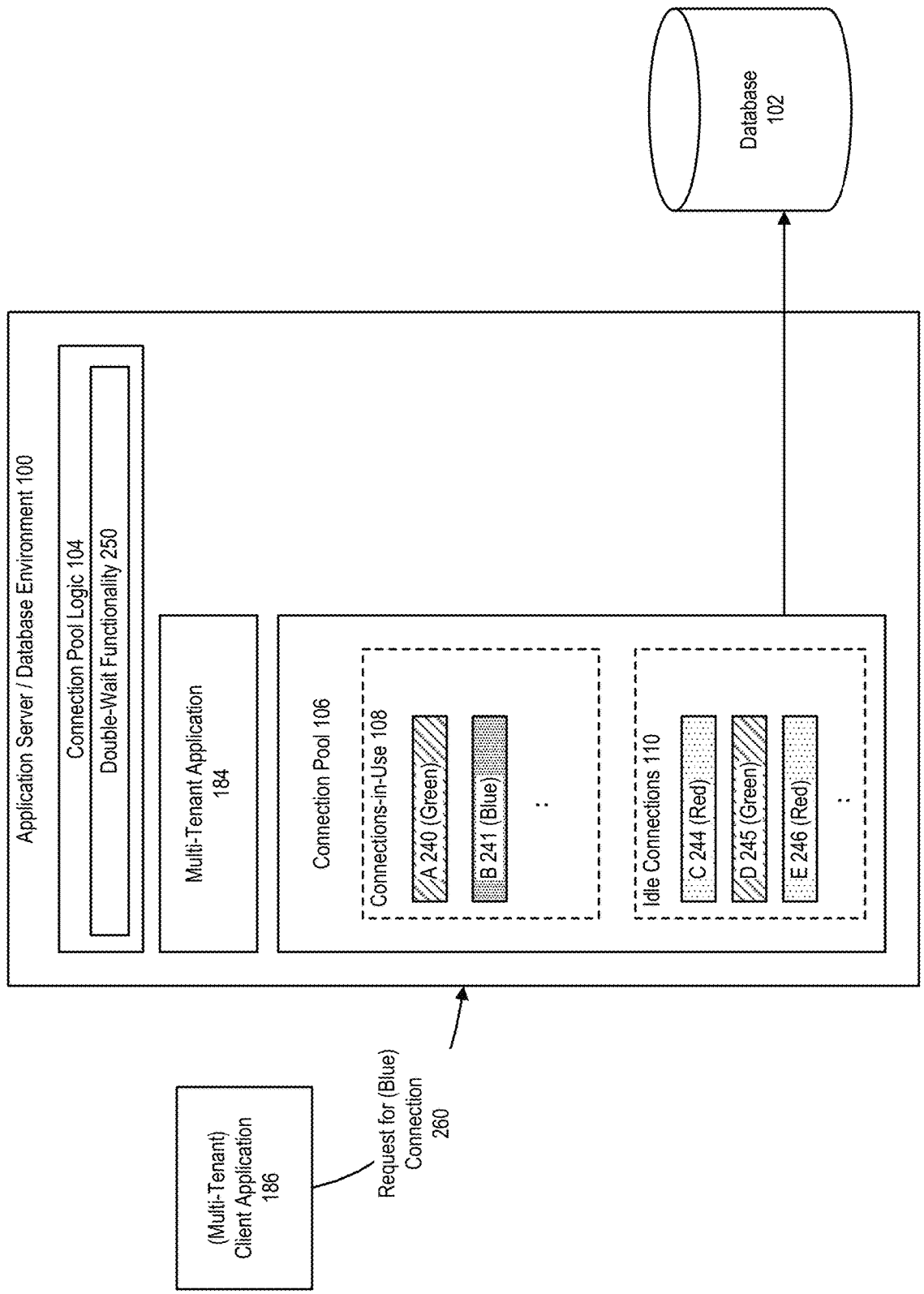
FIG. 5 further illustrates support for efficient repurposing of connections, in a connection pool environment, in accordance with an embodiment.

For example, as illustrated in FIG. 5, in accordance with an embodiment, the connection pool can receive a request for a particular type (e.g., a (Blue)-labeled) connection 260.

Figure 6:
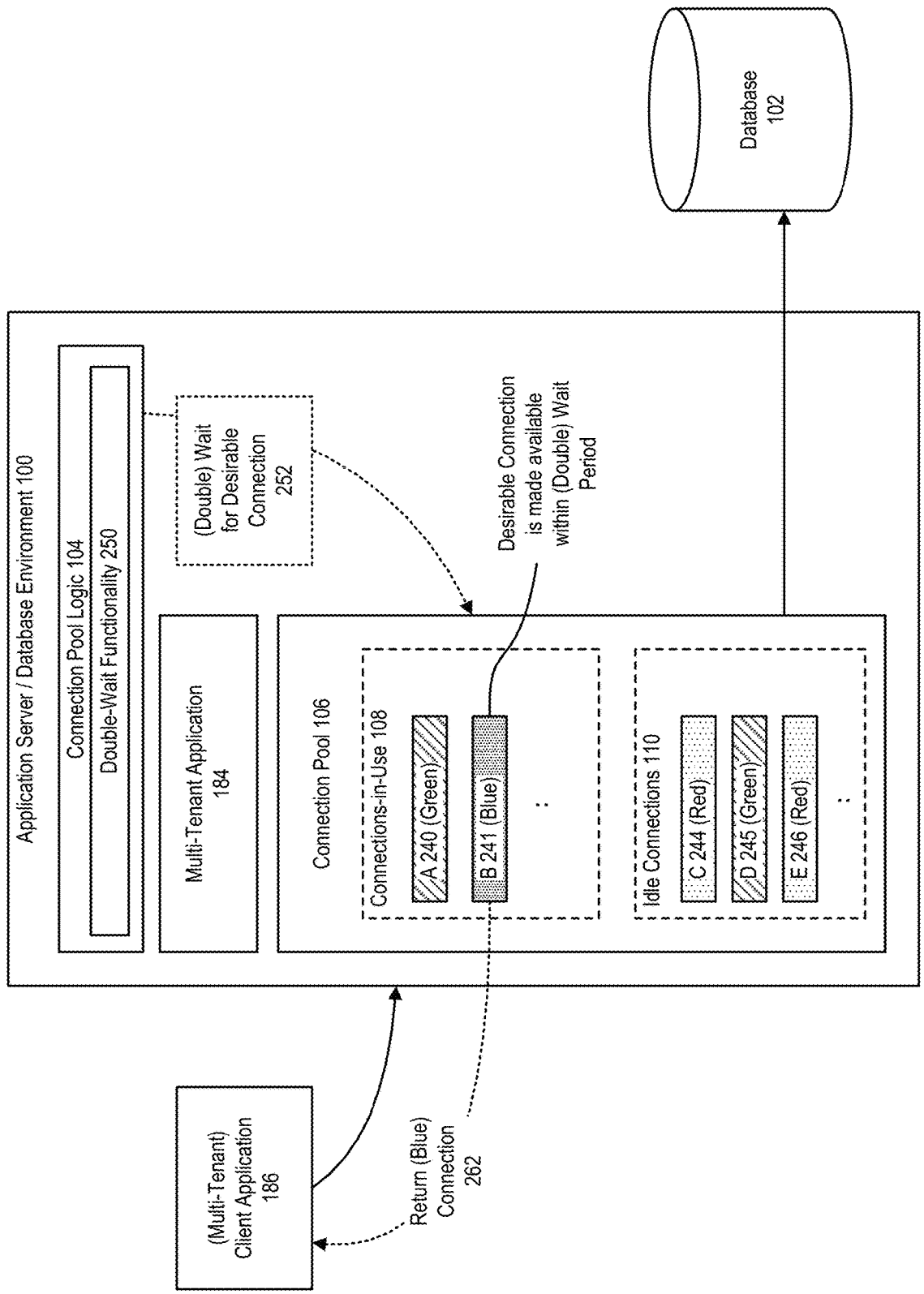
FIG. 6 further illustrates support for efficient repurposing of connections, in a connection pool environment, in accordance with an embodiment.

As illustrated in FIG. 6, in accordance with an embodiment, the system can include a double-wait functionality, which enables the connection pool, instead of or in addition to its single-wait functionality described above, to first determine if a particular connection with the exact desired attributes already exists, but is borrowed at the time of the request; and if so, to wait for a period of time for that connection to become available If a desired connection is made available within the double-wait timeout ($\Delta t_{cdw}$), then it is returned 262 to the client application for its use.

Figure 7:
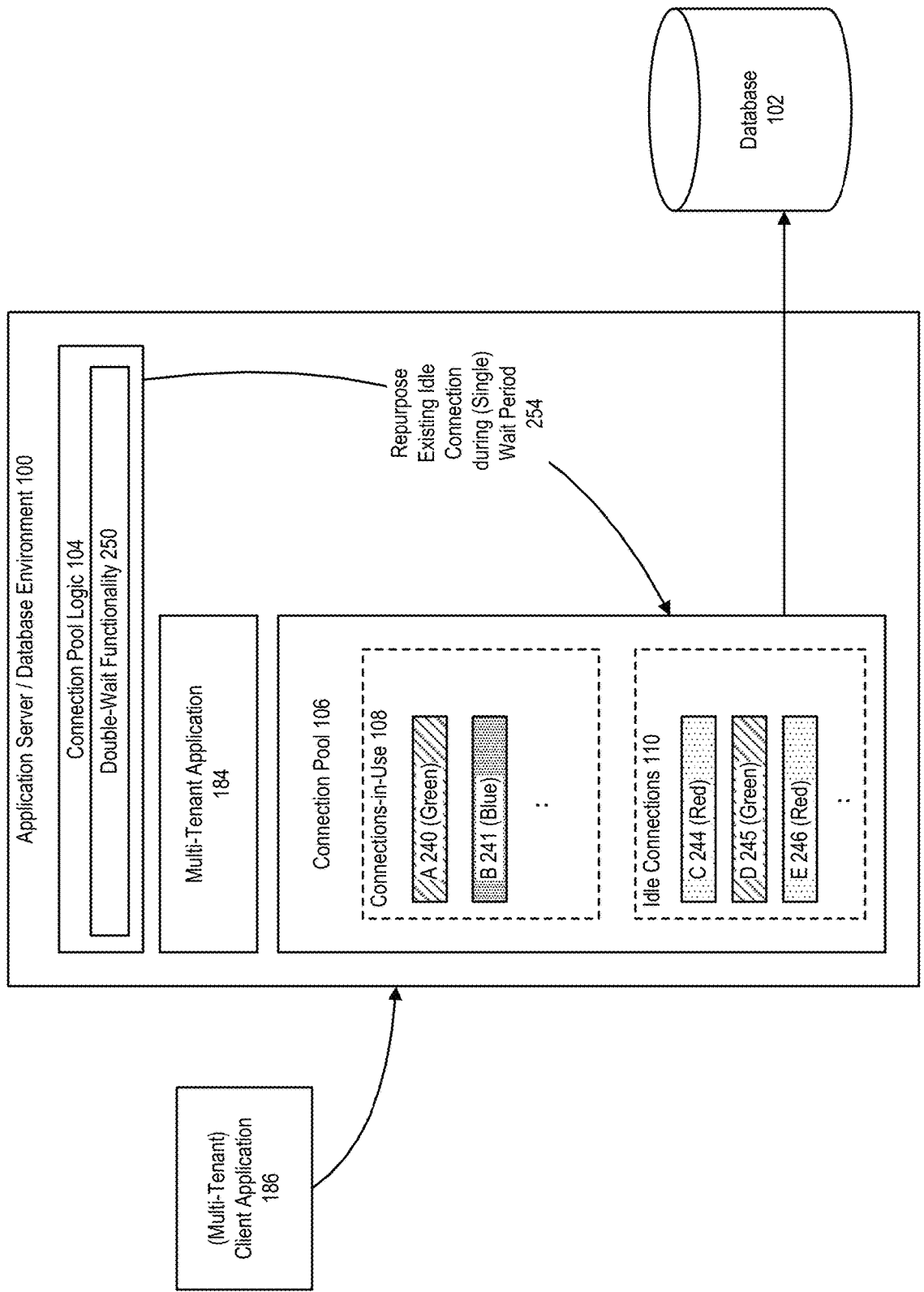
FIG. 7 further illustrates support for efficient repurposing of connections, in a connection pool environment, in accordance with an embodiment.

As illustrated in FIG. 7, in accordance with an embodiment, if a suitable connection does not become available within the double-wait timeout ($\Delta t_{cdw}$), the connection pool can resume its usual procedure, during a single-wait mode.

Figure 8:
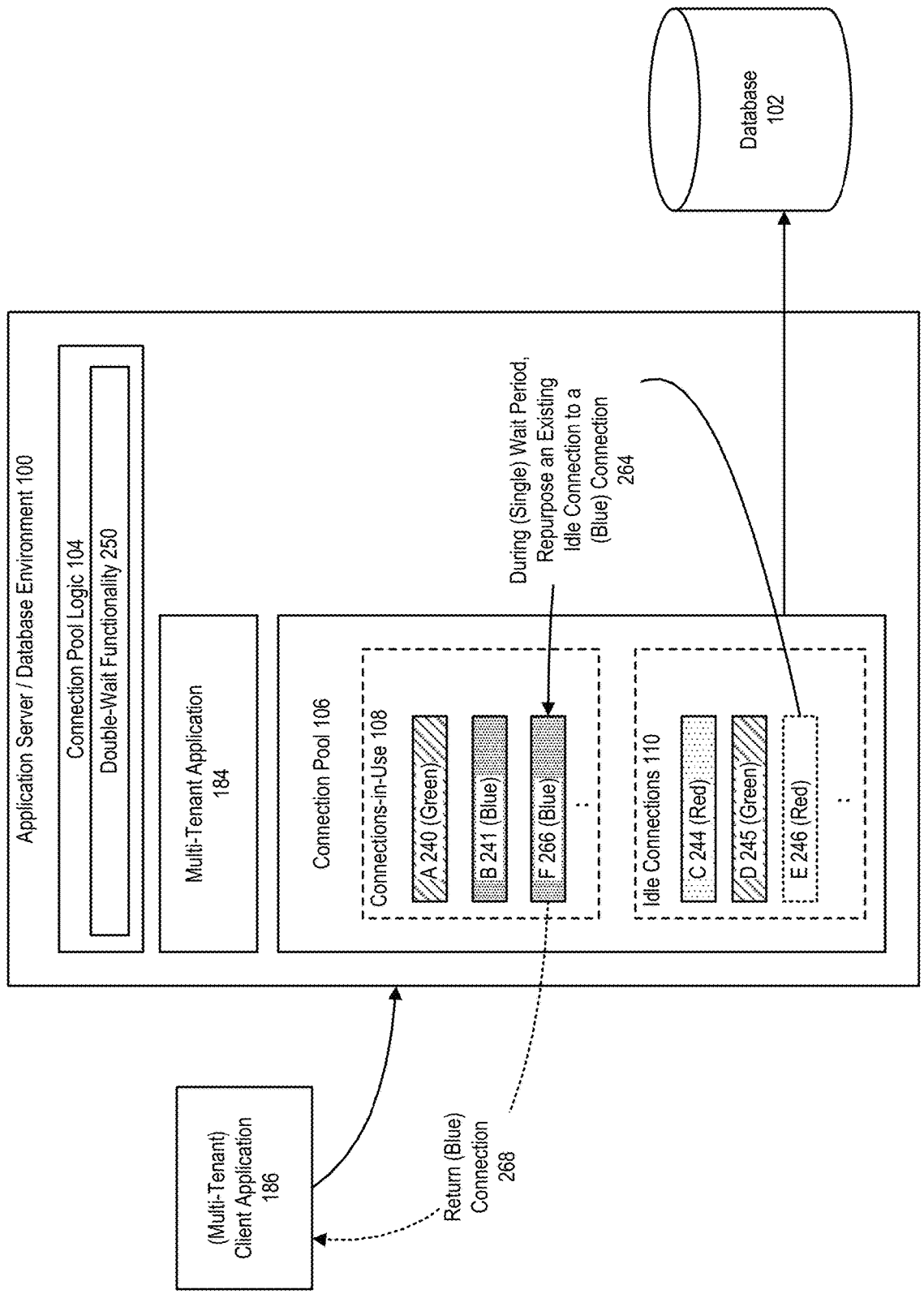
FIG. 8 further illustrates support for efficient repurposing of connections, in a connection pool environment, in accordance with an embodiment.

As illustrated in FIG. 8, in accordance with an embodiment during the (remaining, or single-wait) connection timeout ($\Delta t_{cw}$), the connection pool can determine whether to repurpose 264 an existing idle connection, in this example to a (Blue) Connection 266, and then return it 268, to the client application.

The following additional examples illustrate the above:

Example 1

Consider a pool of 100 connections, in which $\Delta t_{cw}$ is 10 seconds, there are two types of connections, 50 (Green) and 50 (Blue) ones. Currently there are all 50 (Green) and 25 (Blue) ones borrowed, 25 (Blue) ones are available and there are 150 (Green) borrow requests pending. $\Delta t_a b$ is 1 second for now. Consider an example in which F is 0.5. So, $\Delta t_{cdw}$=min ((0.5*10), ((150+1)/50)) i.e., equal to 3 seconds. The borrow request would double-wait for 3 seconds, expecting connection of an exact required type, then it would wait for another 7 seconds to obtain any connection and repurpose it.

Example 2

Consider the example described above with the same inputs, in which there are 300 borrowing requests instead of 150. Then the $\Delta t_{cdw}$=min ((0.5*10), ((300+1)/50)), i.e., equal to 5 seconds. This means that to borrow (Green) connection, a borrow thread would double-wait for 5 seconds, then, if not borrowed, will single-wait for another 5 seconds, repurposing if needed.

Example 3

Consider the example described above with the same inputs, and 5000 borrowing requests instead of 300. $\Delta t_{cdw}$=5 seconds. This results in the same behavior as Example 2.
Connection Borrow Process FIG. 9 further illustrates support for efficient repurposing of connections, in a connection pool environment, in accordance with an embodiment.

Figure 9:
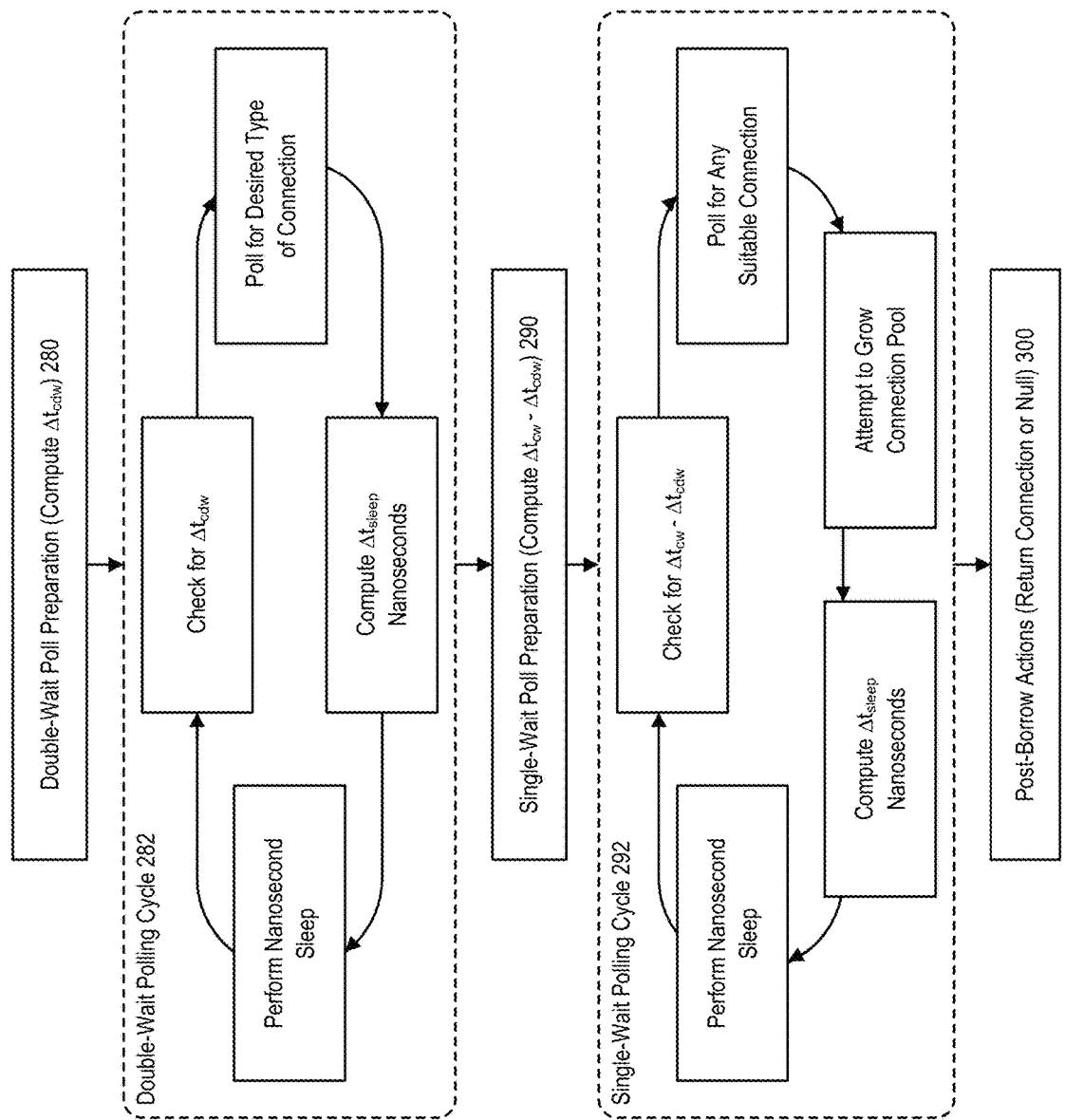
FIG. 9 further illustrates support for efficient repurposing of connections, in a connection pool environment, in accordance with an embodiment.

As illustrated in FIG. 9, in accordance with an embodiment, the connection borrow operation can be viewed as proceeding from a double-wait poll preparation step 280, to a double-wait polling cycle 282, to a single-wait poll preparation step 290, to a single-wait polling cycle 292, to one or more post-borrow action steps 300, each of which are further described below.
Double-Wait Poll Preparations:

In accordance with an embodiment, the double-wait poll preparations can include:
  a. Compute $\Delta t_{cdw}$.
  b. Save a current timestamp, and start double-wait polling.
Double-Wait Polling Cycle:

In accordance with an embodiment, the double-wait polling cycle can include:
  a. Determine $\Delta t_{cdw}$ as the time interval for double-wait polls. Check if it is already passed. If passed, exit the double-wait cycle and start single-wait poll preparations.
  b. Poll for an available valid connection of a proper type. If an available valid connection of a proper type is found, then jump to post-borrow actions; the borrow request is over. If not, then go to next step.
  c. Compute $\Delta t_{sleep}$.
  d. Sleep, and go to (a).
Single-Wait Poll Preparations:

In accordance with an embodiment, the single-wait poll preparations can include:
  a. Compute $\Delta t_{cw} - \Delta t_{cdw}$.
  b. Save current timestamp, and start single-wait polling.
Single-Wait Polling Cycle:

In accordance with an embodiment, the single-wait polling cycle can include:
  a. $\Delta t_{cw} - \Delta t_{cdw}$ is the time interval for single-wait polls. Check if it is already passed. If passed, exit the single-wait cycle and start performing post-borrow actions.
  b. Poll for an available valid connection of any type. If an available valid connection of any type is found, then jump to post-borrow actions; the borrow request is over. If not, then go to next step.
  c. If there is a room to grow the connection pool, then grow it with a connection of the required type. If a new connection has been grown, then get it, and jump to post-borrow actions; the borrow request is over. If not, then go to next step.
  d. Compute $\Delta t_{sleep}$.
  e. Sleep, and go to (a).
Post-Borrow Actions:

In accordance with an embodiment, the post-borrow actions can include:
  a. Perform some post-borrow actions on a connection.
  b. Return a connection, or null.

In accordance with an embodiment, for the connection return operation for a double-wait mechanism, a regular connection return logic works as needed, returning a connection from an application because it is not needed anymore. The return increments the number of available connections, marks a connection available in the pool, and sends a signal to a pool if it is waiting for at least one available connection.

Figure 10:
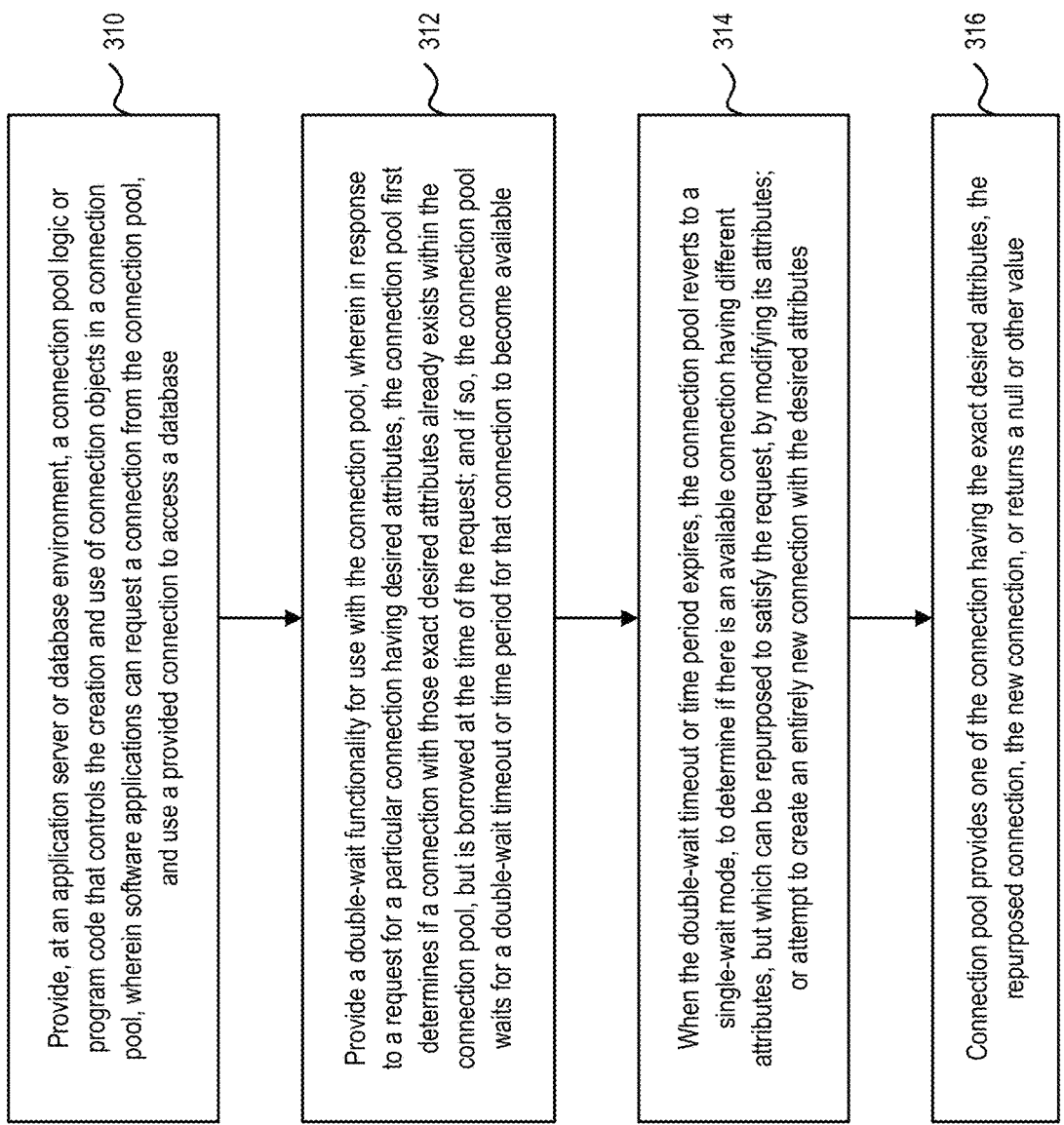
FIG. 10 illustrates a method of providing support for efficient repurposing of connections, in a connection pool environment, in accordance with an embodiment.

FIG. 10 illustrates a method of providing support for efficient repurposing of connections, in a connection pool environment, in accordance with an embodiment.

As illustrated in FIG. 10, in accordance with an embodiment, at step 310, at an application server or database environment, a connection pool logic or program code is provided that controls the creation and use of connection objects in a connection pool, wherein software applications can request a connection from the connection pool, and use a provided connection to access a database.

At step 312, a double-wait functionality is provided for use with the connection pool, wherein in response to a request for a particular connection having desired attributes, the connection pool first determines if a connection with those exact desired attributes already exists within the connection pool, but is borrowed at the time of the request; and if so, the connection pool waits for a double-wait timeout or time period for that connection to become available.

At step 314, when the double-wait timeout or time period expires, the connection pool reverts to a single-wait mode, to determine if there is an available connection having different attributes, but which can be repurposed to satisfy the request, by modifying its attributes; or attempt to create an entirely new connection with the desired attributes.

At step 316, the connection pool provides one of the connection having the exact desired attributes, the repurposed connection, the new connection, or returns a null or other value.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing access to a database, including support for efficient repurposing of connections, comprising:
   a computer including a processor, and at least one of an application server or database environment executing thereon;
   wherein the system controls creation and use of connection objects in a connection pool that enables software applications to request a connection from the connection pool, and use a provided connection to access a database; and
   wherein the system determines a value for a connection wait time period defined by a configurable connection pool property, and dynamically calculates a value for a double-wait time period that is proportional to an average connection borrow time interval, subject to a maximal value, wherein in response to receiving a request for a connection with the desired attributes,
   during the double-wait time period associated with the request, operating in a double-wait mode, including:
      determining if a particular connection with the desired attributes already exists within the connection pool, but is borrowed at time of the request; and
      if the particular connection with the desired attributes already exists within the connection pool, but is borrowed at the time of the request, then waiting and polling during the double-wait time period that is less than the connection wait time period, for the particular connection with the desired attributes to become available for re-use; and
   if the particular connection with the desired attributes does not become available for re-use during the double-wait time period, then upon completion of the double-wait time period associated with the request, reverting to a single-wait mode, including continuing to wait and poll while determining, during a remainder of the connection wait time period, to one of create or repurpose another connection to have the desired attributes.

2. The system of claim 1, wherein the connection pool is polled using two different modes, including:
   in a connection single-wait mode, the connection pool operates so that a borrow request expects any connection to show up available to be reserved, repurposed if needed, and then borrowed; and
   in a connection double-wait mode, the connection pool operates so that a borrow request expects only a connection having the desired attributes, such that a repurpose is not needed.

3. The system of claim 1, wherein the system enables software applications to associate particular labels with particular connection states.

4. The system of claim 1, wherein each software application is associated with one or more tenants of the application server or database environment, or of a cloud-based or other networked environment.

5. The system of claim 1, wherein the connection pool provides access to a multi-tenant database environment that includes one or more pluggable databases, wherein each pluggable database is associated with a tenant of the multi-tenant database environment.

6. A method for providing access to a database, including support for efficient repurposing of connections, comprising:
   providing, at a computer including a processor, at least one of an application server or database environment executing thereon, and a connection pool that includes connection objects and that enables software applications to request a connection from the connection pool, and use a provided connection to access a database;
   determining a value for a connection wait time period defined by a configurable connection pool property, and dynamically calculating a value for a double-wait time period that is proportional to an average connection borrow time interval, subject to a maximal value, wherein in response to receiving a request for a connection with the desired attributes,
   during the double-wait time period associated with the request, operating in a double-wait mode, including:
      determining if a particular connection with the desired attributes already exists within the connection pool, but is borrowed at time of the request; and
      if the particular connection with the desired attributes already exists within the connection pool, but is borrowed at the time of the request, then waiting and polling during the double-wait time period that is less than the connection wait time period, for the particular connection with the desired attributes to become available for re-use; and
   if the particular connection with the desired attributes does not become available for re-use during the double-wait time period, then upon completion of the double-wait time period associated with the request, reverting to a single-wait mode, including continuing to wait and poll while determining, during a remainder of the connection wait time period, to one of create or repurpose another connection to have the desired attributes.

7. The method of claim 6, wherein the connection pool is polled using two different modes, including:
   in a connection single-wait mode, the connection pool operates so that a borrow request expects any connection to show up available to be reserved, repurposed if needed, and then borrowed; and
   in a connection double-wait mode, the connection pool operates so that a borrow request expects only a connection having the desired attributes, such that a repurpose is not needed.

8. The method of claim 6, wherein software applications are enabled to associate particular labels with particular connection states.

9. The method of claim 6, wherein each software application is associated with one or more tenants of the application server or database environment, or of a cloud-based or other networked environment.

10. A non-transitory computer readable storage medium, including instructions stored thereon which when read and executed by one or more computers cause the one or more computers to perform the method comprising:
    providing, at a computer including a processor, at least one of an application server or database environment executing thereon, and a connection pool that includes connection objects and that enables software applications to request a connection from the connection pool, and use a provided connection to access a database;
    determining a value for a connection wait time period defined by a configurable connection pool property, and dynamically calculating a value for a double-wait time period that is proportional to an average connection borrow time interval, subject to a maximal value, wherein in response to receiving a request for a connection with the desired attributes, during the double-wait time period associated with the request, operating in a double-wait mode, including:
  determining if a particular connection with the desired attributes already exists within the connection pool, but is borrowed at time of the request; and
  if the particular connection with the desired attributes already exists within the connection pool, but is borrowed at the time of the request, then waiting and polling during the double-wait time period that is less than the connection wait time period, for the particular connection with the desired attributes to become available for re-use; and
if the particular connection with the desired attributes does not become available for re-use during the double-wait time period, then upon completion of the double-wait time period associated with the request, reverting to a single-wait mode, including continuing to wait and poll while determining, during a remainder of the connection wait time period, to one of create or repurpose another connection to have the desired attributes.

11. The non-transitory computer readable storage medium of claim 10, wherein the connection pool is polled using two different modes, including:
  in a connection single-wait mode, the connection pool operates so that a borrow request expects any connection to show up available to be reserved, repurposed if needed, and then borrowed; and
  in a connection double-wait mode, the connection pool operates so that a borrow request expects only a connection having the desired attributes, such that a repurpose is not needed.

12. The non-transitory computer readable storage medium of claim 10, wherein software applications are enabled to associate particular labels with particular connection states.

\* \* \* \* \*

UNITED STATES PATENT AND TRADEMARK OFFICE
CERTIFICATE OF CORRECTION

| | | |
|---|---|---|
| PATENT NO. | : 11,120,036 B2 | Page 1 of 1 |
| APPLICATION NO. | : 15/227899 | |
| DATED | : September 14, 2021 | |
| INVENTOR(S) | : de Lavarene et al. | |

It is certified that error appears in the above-identified patent and that said Letters Patent is hereby corrected as shown below:

In the Specification

In Column 12, Line 19, delete "Δt" and insert -- At --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*